United States Patent
Endo (10) Patent No.: US 7,224,149 B2
(45) Date of Patent: May 29, 2007

(54) CURRENT RESONANCE TYPE DC/DC CONVERTER CAPABLE OF DECREASING LOSSES ON NO-LOAD AND A LIGHT LOAD

(75) Inventor: Naoto Endo, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/412,012

(22) Filed: Apr. 26, 2006

(65) Prior Publication Data

US 2007/0018617 A1  Jan. 25, 2007

(30) Foreign Application Priority Data

Jul. 19, 2005 (JP) ............................... 2005-209202

(51) Int. Cl.
  *G05F 1/00* (2006.01)
(52) U.S. Cl. ...................... 323/222; 323/282; 323/235
(58) Field of Classification Search ................ 323/222, 323/282, 284, 235, 224, 259
  See application file for complete search history.

(56) References Cited

U.S. PATENT DOCUMENTS

| | | |
|---|---|---|
| 4,720,667 A | 1/1988 | Lee et al. |
| 5,636,106 A * | 6/1997 | Batarseh et al. ............... 363/16 |
| 5,663,635 A | 9/1997 | Vinciarelli et al. |
| 6,038,154 A * | 3/2000 | Boylan et al. ............... 363/127 |
| 6,700,801 B2 * | 3/2004 | Morita et al. ............. 363/21.12 |
| 6,710,582 B2 * | 3/2004 | Watanabe .................... 323/222 |
| 7,002,323 B2 * | 2/2006 | Natori ........................ 323/225 |
| 7,006,362 B2 * | 2/2006 | Mizoguchi et al. ........... 363/16 |

OTHER PUBLICATIONS

Related U.S. Appl. No. 11/413,726, filed Apr. 28, 2006; Inventor: Endo, Naoto.; and.
Related U.S. Appl. No. 11/413,557, filed Apr. 28, 2006; Inventor: Endo, Naoto.

* cited by examiner

Primary Examiner—Bao Q. Vu
(74) Attorney, Agent, or Firm—Frishauf, Holtz, Goodman & Chick, P.C.

(57) ABSTRACT

In a control circuit for controlling a current resonance type DC/DC converter, a negative voltage detection arrangement produces a pulse while a both-ends voltage of a resonance capacitor has a negative voltage. A voltage level error signal generating circuit includes a capacitor which is charged during production of the pulse and generates a voltage level error signal where a voltage level rises. A timer produces a timer signal having a sawtooth waveform where a voltage level gradually rises. An off timing generating circuit compares the timer signal with the voltage level error signal to generate an off timing signal defining a timing for making a short-circuit switch turn off. Responsive to the off timing signal, a driving control signal generating arrangement generates a second driving control signal indicative of turning-off of the short-circuit switch.

6 Claims, 5 Drawing Sheets

CURRENT RESONANCE TYPE DC/DC CONVERTER CAPABLE OF DECREASING LOSSES ON NO-LOAD AND A LIGHT LOAD

This application claims priority to prior application JP 2005-209202, the disclosure of which is incorporated herein by reference.

BACKGROUND OF THE INVENTION

This invention relates to a switching power converter and, in particular, to a current resonance type DC/DC converter including a resonance circuit and a method of controlling a resonance current thereof.

In the manner which is well known in the art, the DC/DC converter is a switching power converter for converting an input DC voltage (which will later be merely also called an "input voltage") into an output DC voltage (which will later be merely also called an "output voltage") which is different from the input DC voltage.

As one of the DC/DC converters, there is a PWM (pulse width modulation) type DC/DC converter is known in the art. The PWM type DC/DC converters have various types which are classified into a step-down type, a step-up type, a polarity reversing type, or the like. The step-down PWM type DC/DC converter comprises an energizing switch, a short-circuit switch, and an output inductor. In lieu of the short-circuit switch, a diode may be used.

However, the PWM type DC/DC converter is disadvantageous in that it has a large switching loss when the energizing switch changes from an on state to an off state or changes from an off state to an on state. As a DC/DC converter which is capable of eliminating such a switching loss, a current resonance type DC/DC converter is known, for example, in U.S. Pat. No. 5,663,635 issued by Vinciarelli et al.

Although the current resonance type DC/DC converter will later be described in conjunction with FIG. 1, the current resonance type DC/DC converter comprises a current resonance type DC/DC converting portion which includes an energizing switch, a resonance inductor, a resonance capacitor, a short-circuit switch, and an output inductor. The energizing switch is turned on/off in response to a first driving control signal. The resonance inductor has an end connected to the energizing switch. The resonance capacitor has an end connected to another end of the resonance inductor and another end which is grounded. The short-circuit switch is connected in parallel with the resonance capacitor. The short-circuit switch is turned on/off in response to a second driving control signal. The output inductor has an end connected to the other end of the resonance inductor and another end connected to an end of an output capacitor.

In the current resonance type DC/DC converter, a current flows through the resonance inductor only for a resonance duration with respect to a switching period. The current does not flow through the resonance inductor for a duration obtained by removing the resonance duration from the switching period. When an input/output voltage ratio becomes smaller, the switching period with respect to the resonance duration becomes longer. As a result, durations where the current does not flow through the resonance inductor increase, as described, for example, in U.S. Pat. No. 4,720,667 issued by Lee et al.

The current resonance type DC/DC converter has a large advantage where a zero-current switching (ZCS) of the energizing switch is enable by using a series resonance of a series resonance circuit consisting of the resonance inductor and the resonance capacitor, and it results in eliminating the switching loss.

In the conventional current resonance type DC/DC converter, a resonance current value is fixed to a value by an input voltage of an input power supply, the resonance inductor, and the resonance capacitor. Therefore, in order to always actualize the zero-current switching (ZCS), it is necessary to always flow, through the resonance inductor, the resonance current having a peak equivalent to a maximum output current value. For example, it will be assumed that the maximum output current value is equal to ten amperes. In this event, it is necessary for the peak of the resonance current have ten amperes or more.

In other words, it is necessary to always flow the resonance current having the peak equivalent to the maximum output current value through the resonance inductor not only on a heavy load where an output current is large but also on no-load or a light load where the output current is small.

In the manner which is described above, it is necessary to always flow the resonance current having the peak equivalent to the maximum output current value through the resonance inductor also on the no-load or the light load where the output current is small. Therefore, on the no-load or the light load, losses become larger caused by the resonance current flowing through the resonance inductor and parasitic resonance components of the energizing switch, the resonance inductor, the resonance capacitor, and so on. As a result, the conventional current resonance type DC/DC converter is disadvantageous in that it has a low degree of efficiency.

SUMMARY OF THE INVENTION

It is therefore an object of the present invention to provide a current resonance type DC/DC converter and a resonance current control method which are capable of decreasing losses on no-load and a light load.

Other objects of this invention will become clear as the description proceeds.

On describing the gist of a first aspect of this invention, it is possible to be understood that a method is of controlling a resonance current flowing through a resonance circuit for use in a current resonance type DC/DC converter comprising a current resonance type DC/DC converting portion including a switch and the resonance circuit. According to the first aspect of this invention, the method comprises the step of controlling magnitude of the resonance current in accordance with a load by changing an off timing of the switch.

In the above-mentioned method, the method may comprises the step of controlling the magnitude of the resonance current to as to make the magnitude of the resonance current on no-load or a light load smaller than that on a heavy load.

On describing the gist of a second aspect of this invention, it is possible to be understood that a method is of controlling a resonance current flowing through a resonance inductor for use in a current resonance type DC/DC converter including a current resonance type DC/DC converting portion. The current resonance type DC/DC converting portion comprises an energizing switch being turned on/off in response to a first driving control signal, the resonance inductor having an end connected to the energizing switch, a resonance capacitor having an end connected to another end of the resonance inductor and another end which is grounded, a short-circuit switch, connected in parallel with the resonance capacitor, being turned on/off in response to a second driving control signal, and an output inductor having an end connected to the other end of the resonance inductor and another end connected to an end of an output capacitor. According to the second aspect of this invention, the method comprises the step of producing the second driving control signal so as to make the short-circuit switch turn off the moment at which a current flowing through the output inductor flows toward the short-circuit switch, thereby controlling magnitude of the resonance current in accordance with a load.

According to the second aspect of this invention, in the above-mentioned method, the short-circuit switch may comprise an N-channel metal oxide semiconductor field effect transistor (MOSFET). A parasitic diode may be parasitic on the short-circuit switch. The method may comprise the steps of producing a pulse while a both-ends voltage of the resonance capacitor has a negative voltage, of producing a voltage level error signal where a voltage level thereof rises with a capacitor charged during production of the pulse, of producing a timer signal having a sawtooth waveform where a voltage level thereof gradually rises, of comparing the timer signal with the voltage level error signal to generate an off timing signal defining a timing for making the short-circuit switch turn off, and of producing, in response to the off timing signal, the second driving control signal for turning the short-circuit switch off.

On describing the gist of a third aspect of this invention, it is possible to be understood that a current resonance type DC/DC converter includes a current resonance type DC/DC converting portion which comprises an energizing switch being turned on/off in response to a first driving control signal, a resonance inductor having an end connected to the energizing switch, a resonance capacitor having an end connected to another end of the resonance inductor and another end which is grounded, a short-circuit switch, connected in parallel with the resonance capacitor, being turned on/off in response to a second driving control signal, and an output inductor having an end connected to the other end of the resonance inductor and another end connected to an end of an output capacitor. According to the third aspect of this invention, the current resonance type DC/DC converter comprises a control circuit for producing the second driving control signal so as to make the short-circuit switch turn off the moment at which a current flowing through the output inductor flows toward the short-circuit switch, thereby controlling magnitude of a resonance current flowing though the resonance inductor in accordance with a load.

According to the third aspect of this invention, in the above-mentioned current resonance type DC/DC converter, the short-circuit switch may comprise an N-channel metal oxide semiconductor field effect transistor (MOSFET) having a drain electrode connected to the end of the output inductor and a source electrode which is grounded. A parasitic diode may be parasitic on the short-circuit switch. In this event, the control circuit may comprise a negative voltage detection arrangement for comparing a drain voltage of the short-circuit switch with a source voltage of the short-circuit switch to produce a pulse while a both-ends voltage of the resonance capacitor has a negative voltage, a voltage level error signal generating circuit including a capacitor which is charged during production of the pulse. The voltage level error signal generating circuit generates a voltage level error signal where a voltage level thereof rises. A timer is for producing a timer signal having a sawtooth waveform where a voltage level thereof gradually rises. An off timing generating circuit is for comparing the timer signal with the voltage level error signal to generate an off timing signal defining a timing for making the short-circuit switch turn off. A driving control signal generating arrangement is for generating, in response to the off timing signal, the second driving control signal indicative of turning-off of the short-circuit switch. The control circuit further may comprise a zero-voltage detection arrangement for comparing the drain voltage of the short-circuit switch with the source voltage of the short-circuit switch to produce a zero-voltage detected signal when a both-ends voltage of the resonance capacitor is equal to zero volt, and an on timing generating circuit for generating, in response to the zero-voltage detected signal, an on timing signal defining a timing for making the short-circuit switch turn on. In this event, the driving control signal generating arrangement generates, in response to the on timing signal, the second driving control signal indicative of turning-on of the short-circuit switch.

DESCRIPTION OF THE PREFERRED EMBODIMENT

Figure 1:
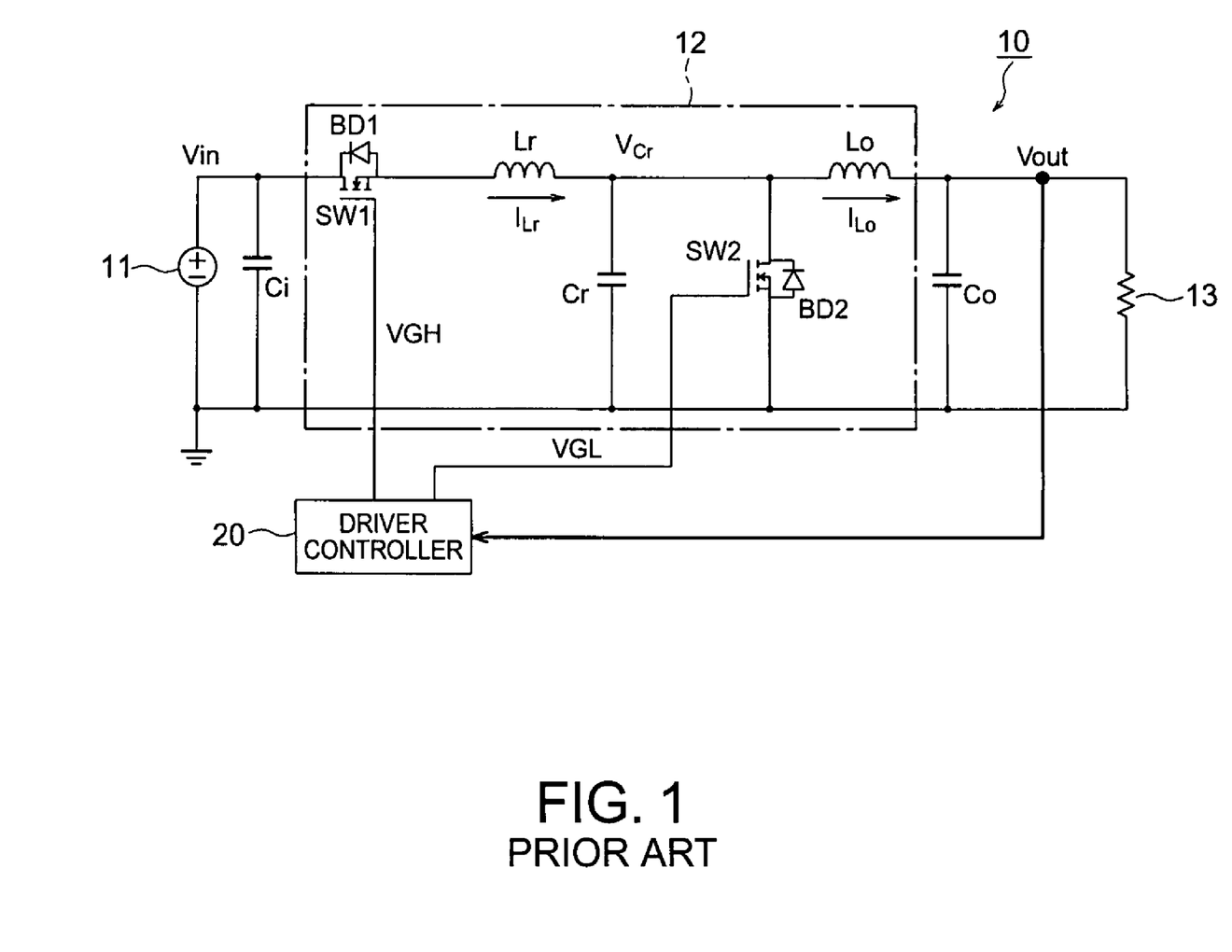
FIG. 1 is a block diagram showing structure of a conventional full-wave current resonance DC/DC converter of a step-down type and a synchronous type.

Referring to FIG. 1, a conventional current resonance type DC/DC converter 10 will first be described in order to facilitate an understanding of the present invention. In the example being illustrated, the current resonance type DC/DC converter 10 is a full-wave current resonance type DC/DC converter. The illustrated full-wave current resonance type DC/DC converter 10 is a step-down type and a synchronous type. That is, an output voltage Vout is lower than an input voltage Vin. An input power supply 11 is connected in parallel with an input capacitor Ci. A load 13 is connected in parallel with a capacitance element (an output capacitor) Co. Between the input capacitor Cin and the output capacitor Co, a full-wave current resonance type DC/DC converting portion 12 is connected.

The full-wave current resonance type DC/DC converting portion 12 comprises an energizing switch SW1, a short-circuit switch SW2, an output inductor Lo, a resonance inductor Lr, and a resonance capacitor Cr. A combination of the resonance inductor Lr and the resonance capacitor Cr constitutes a series resonance circuit. The series resonance circuit is inserted between the energizing switch SW1 and the short-circuit switch SW2.

The energizing switch SW1 is also called a first switch while the short-circuit switch SW2 is also called a second switch. Each of the energizing switch SW1 and the short-circuit switch SW2 comprises an N-channel metal oxide semiconductor field effect transistor (MOSFET). A first body diode BD1 is parasitic on the first switch SW1 while a second body diode BD2 is parasitic on the second switch SW2.

More specifically, the energizing switch SW1 has a source electrode which is equivalently connected to an anode electrode of the first body diode BD1. The energizing switch SW1 has a drain electrode which is equivalently connected to a cathode electrode of the first body diode BD1. The short-circuit switch SW2 has a source electrode which is equivalently connected to an anode electrode of the second body diode BD2. The short-circuit switch SW2 has a drain electrode which is equivalently connected to a cathode electrode of the second body diode BD2.

That is, the full-wave current resonance type DC/DC converting portion 12 is similar in structure to the above-mentioned PWM type DC/DC converter except that the series resonance circuit consisting of the resonance inductor Lr and the resonance capacitor Cr is added.

The energizing switch (the first switch) SW1 has an end (the drain electrode) connected to a positive electrode of the input power supply 11. The energizing switch (the first switch) SW1 has another end (the source electrode) connected to an end of the resonance inductor Lr. The resonance inductor Lr has another end which is grounded through the resonance capacitor Cr. The short-circuit switch (the second switch) SW2 is connected in parallel with the resonance capacitor Cr. Specifically, the short-circuit switch SW2 has an end (the drain electrode) connected to a connection node between the resonance inductor Lr and the resonance capacitor Cr. The short-circuit switch SW2 has another end (the source electrode) which is grounded. The other end of the resonance inductor Lr is also connected to an end of the output inductor Lo. The output inductor Lo has another end which is grounded through the output capacitor Co. The output capacitor Co has both ends between which the output voltage Vout occurs.

The first switch (the energizing switch) SW1 is called a high-side switch while the second switch (the short-circuit switch) SW2 is called a low-side switch. Control of turning on/off of the energizing switch SW1 and the short-circuit switch SW2 is carried out by first and second driving control signals VGH and VGL supplied from a driver controller 20 which serves as a control circuit. More specifically, the driver controller 20 supplies, as the first driving control signal, a driving high-side gate signal VGH to a gate electrode of the energizing switch SW1 while the driver controller 20 supplies, as the second driving control signal, a driving low-side gate signal VGL to a gate electrode of the short-circuit switch SW2.

Referring now to FIG. 1, description will be made as regards operation of the full-wave current resonance type DC/DC converter 10. It will first be assumed that the first switch SW1 is put into an off state while the second switch SW2 is put into an on state. In this event, a current $I_{Lo}$ flowing through the output inductor Lo and a current $I_{SW2}$ flowing through the second switch SW2 linearly decrease at an inclination of −Vout/Lo.

Subsequently, it will be assumed that both of the first and the second switches SW1 and SW2 are put into the off state. A time duration where both of the first and the second switches SW1 and SW2 are put into the off state is called a dead time. For a duration of the dead time, the current $I_{SW2}$ flowing through the second switch SW2 becomes zero while a current $I_{BD2}$ flows through the second body diode BD2 in place of the second switch SW2.

It will be assumed that the first switch SW1 is turned on while the second switch SW2 is turned off. In this event, a current $I_{SW1}$ flowing through the first switch SW1 linearly increases at an inclination of Vin/Lo. On the other hand, the current $I_{BD2}$ flowing through the second body diode BD2 decreases with increase in the current $I_{SW1}$ flowing through the first switch SW1. Under the circumstances, a both-ends voltage $V_{Cr}$ of the resonance capacitor Cr is clamped to zero volt by the second body diode BD2.

At a time instant after a lapse of a first time interval $T1=(I_{Lo}Lr)/Vin$ from a time instant when the first switch SW1 is turned on, the current $I_{SW1}$ flowing through the first switch SW1 and a current $I_{Lo}$ flowing through the output inductor Lo are equal to each other, namely, ($I_{SW1}=I_{Lo}$), and then the series resonance circuit starts resonance. Accordingly, a current $I_{Cr}$ flowing in the resonance capacitor Cr increases gradually, reaches a peak, and thereafter decreases gradually. In this event, the both-ends voltage $V_{Cr}$ of the resonance capacitor Cr increases gradually to become a voltage 2Vin which is twice as much as the input voltage Vin. When the current $I_{Cr}$ flowing in the resonance capacitor Cr reaches the peak, the both-ends voltage $V_{Cr}$ of the resonance capacitor Cr is equal to the input voltage Vin.

A second time interval T2 where the current $I_{Cr}$ flows in the resonance capacitor Cr (namely, a duration where the resonance capacitor Cr is charged) is equal to a half of the reciprocal of a resonance frequency fr defined by an inductance value of the resonance inductor Lr and a capacitance value of the resonance capacitor Cr, namely, $T2=\frac{1}{2}fr=\pi\sqrt{(LrCr)}$. When the current $I_{Cr}$ flowing in the resonance capacitor Cr is zero, the current $I_{SW1}$ flowing through the first switch SW1 and the current $I_{Lo}$ flowing through the output inductor Lo are equal to each other.

When the current $I_{SW1}$ flowing through the first switch SW1 is less than the current $I_{Lo}$ flowing through the output inductor Lo, the resonance capacitor Cr starts discharge to flow a discharge current $I_{Cr}$ out of the resonance capacitor Cr. Therefore, the both-ends voltage $V_{Cr}$ of the resonance capacitor Cr turns to reduce gradually.

At a time instant when the current $I_{SW1}$ flowing through the first switch SW1 becomes zero, the first switch SW1 is turned off. That is, the first switch SW1 is subjected to a zero-current switching (ZCS). Thereafter, a current $I_{BD1}$ backflows to the input power supply 11 through the first body diode BD1. At a time instant when the current $I_{BD1}$ flowing back in the first body diode BD1 becomes zero, the resonance of the series resonance circuit stops.

Inasmuch as the current $I_{Cr}$ discharging from the resonance capacitor Cr and the current $I_{Lo}$ flowing through the output inductor Lo are equal to each other, namely, $I_{Lo}=I_{Cr}$ after a time instant when the current $I_{BD1}$ flowing through the first body diode BD1 becomes zero, the resonance capacitor Cr substantially discharges at a direct current fashion. Under the circumstances, the both-ends voltage $V_{Cr}$ of the resonance capacitor Cr linearly decreases at the inclination of $I_{Lo}/Cr$.

When the resonance capacitor Cr perfectly discharges, the current $I_{BD2}$ turns to flow through the second body diode BD2.

It will be assumed that the second switch SW2 is turned on while the first switch SW1 is put into the off state. In this even, the current $I_{SW2}$ flows through the second switch SW2. The current $I_{SW2}$ flowing through the second switch SW2 and the current $I_{Lo}$ flowing through the output indictor Lo are equal to each other.

Thereafter, the above-mentioned operation is repeated.

In the manner which is described above, the full-wave current resonance type DC/DC converter 10 turns the energizing switch SW1 off at a time instant when the current $I_{SW1}$ backflows to resonate and becomes zero again after the current $I_{SW1}$ flowing through the energizing switch SW1 becomes zero. In addition, for a duration where the both-ends voltage $V_{Cr}$ of the resonance capacitor Cr is zero volt, the short-circuit switch SW2 is put into the on state.

In addition, the current $I_{Lr}$ flows through the resonance inductor Lr only for a resonance duration with respect to a switching period. The current $I_{Lr}$ does not flow through toward the resonance inductor Lr for a duration obtained by removing the resonance duration from the switching period. When an input/output voltage ratio Vin/Vout becomes smaller, the switching period with respect to the resonance duration becomes longer. As a result, durations where the current $I_{Lr}$ does not flow toward the resonance inductor Lr increase, as described, for example, in the above-mentioned U.S. Pat. No. 4,720,667 issued by Lee at al.

At any rate, the full-wave current resonance type DC/DC converter 10 illustrated in FIG. 1 has a large advantage where the zero-current switching (ZCS) of the first switch (the energizing switch) SW1 is enable by using a series resonance of the series resonance circuit consisting of the resonance inductor Lr and the resonance capacitor Cr, and it results in eliminating the switching loss.

In the illustrated full-wave current resonance type DC/DC converter 10, a resonance current value is fixed to a value by the input voltage Vin of the input power supply 11, the resonance inductor Lr, and the resonance capacitor Cr. Therefore, in order to always actualize the zero-current switching (ZCS), it is necessary to always flow, through the resonance inductor Lr, the resonance current having a peak equivalent to a maximum output current value. For example, it will be assumed that the maximum output current value is equal to ten amperes. In this event, it is necessary for the peak of the resonance current have ten amperes or more.

In other words, it is necessary to always flow the resonance current having the peak equivalent to the maximum output current value through the resonance inductor Lr not only on a heavy load where an output current is large but also on no-load or a light load where the output current is small.

Figure 2A:
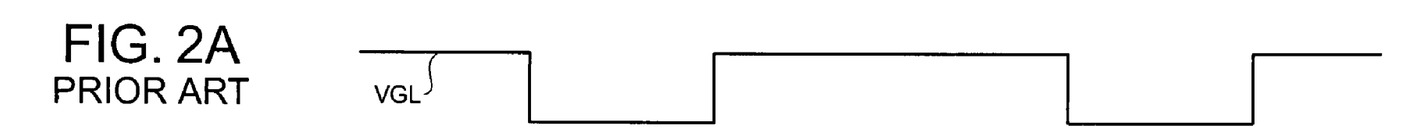
FIGS. 2A through 2E are time charts for use in describing operation of the full-wave resonance type DC/DC converter illustrated in FIG. 1 on no-load.
Figure 2B:
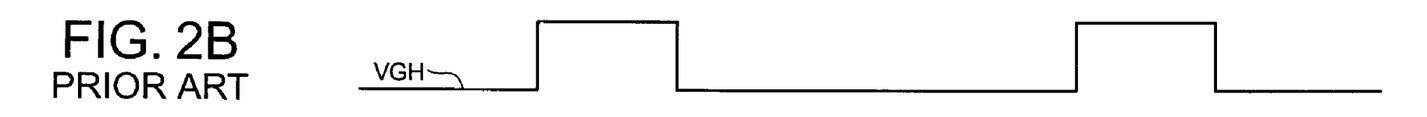
Figure 2C:
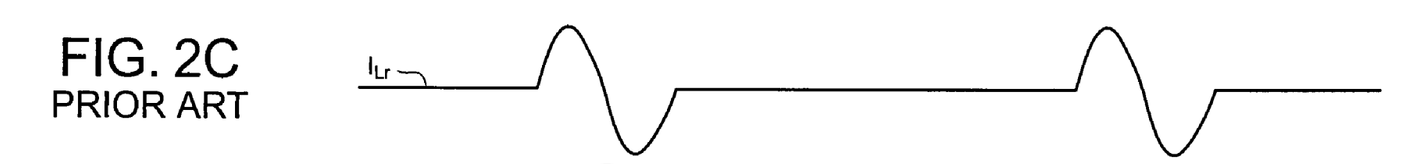
Figure 2D:
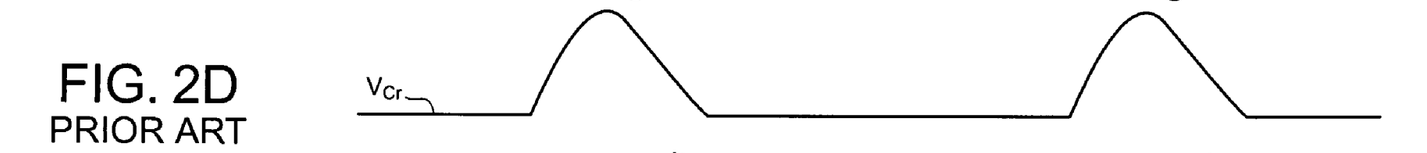
Figure 2E:
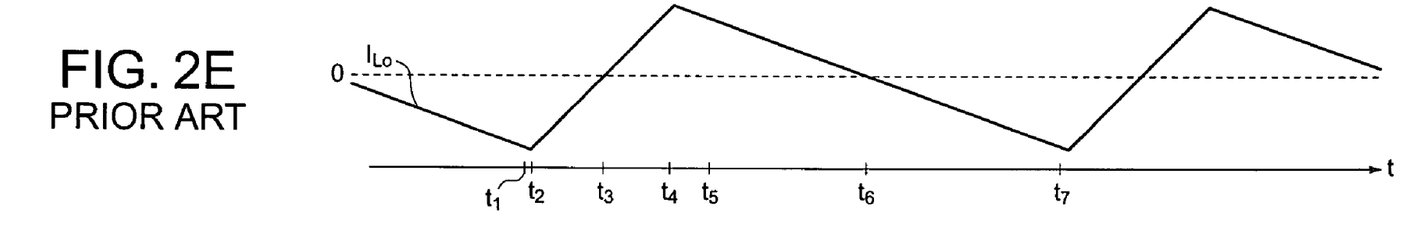

FIGS. 2A through 2E are time charts for use in describing operation of the full-wave current resonance type DC/DC converter 10 on the no-load. FIG. 2A shows the driving low-side gate signal VGL supplied to the gate electrode of the short-circuit switch SW2. FIG. 2B shows the driving high-side gate signal VGH supplied to the gate electrode of the energizing switch SW1. FIG. 2C shows the resonance current $I_{Lr}$ flowing through the resonance inductor Lr. FIG. 2D shows the both-ends voltage $V_{Cr}$ of the resonance capacitor Cr. FIG. 2E shows the current $I_{Lo}$ flowing through the output inductor Lo.

Herein the current $I_{Lr}$ flowing through the resonance inductor Lr and the current $I_{Lo}$ flowing though the output inductor Lo have a positive value when they flow in a direction depicted at arrows of FIG. 1. That is, the current $I_{Lr}$ flowing through the resonance inductor Lr has a positive value (a positive direction) when it flows in the direction of charging the resonance capacitor Cr. The current $I_{Lr}$ flowing through the resonance inductor Lr has a negative value (a negative direction) when it flows in the direction of discharging the resonance capacitor Cr. The current $I_{Lo}$ flowing though the output inductor Lo has a positive value (a positive direction) when it flows in the direction of charging the output capacitor Co, The current $I_{Lo}$ flowing through the output inductor Lo has a negative value (a negative direction) when it flows in the direction of discharging the output capacitor Co.

Referring to FIGS. 2A to 2E in addition to FIG. 1, description will be made as regards the operation of the full-wave current resonance type DC/DC converter 10 on the no-load.

Until a time instant $t_1$, the driving low-side gate signal VGL has the logic high level and the driving high-side gate signal VGH has the logic low level. Accordingly, the short-circuit switch SW2 is put into an ON state while the energizing switch SW1 is put into an OFF state. In the meantime, the current $I_{Lo}$ flowing through the output inductor Lo linearly decreases at an inclination of −Vout/Lo, as shown in FIG. 2E. Inasmuch as the illustrated example shows a case of the no-load, the current $I_{Lo}$ flowing through the output inductor Lo flows in the negative direction where electric charges accumulated in the output capacitor Co are discharged, namely, has the negative value.

When a time t becomes the time instant $t_1$, the driving low-side gate signal VGL changes from the logic high level to the logic low level. Accordingly both of the driving low-side gate signal VGL and the driving high-side gate signal VGH have the logic low level. As a result, both of the short-circuit switch SW2 and the energizing switch SW1 are put into the OFF state. In the manner which is described above, the time interval where both of the short-circuit switch SW2 and the energizing switch SW1 are put into OFF state is called the dead time.

When the time t becomes a time instant $t_2$, the driving high-side gate signal VGH changes the logic low level to the logic high level. That is, the energizing switch SW1 is turned on. Accordingly, the series resonance circuit consisting of the resonance inductor Lr and the resonance capacitor Cr starts resonance and the current $I_{Lr}$ having a sinusoidal waveform flows through the resonance inductor Lr, as shown in FIG. 2C. When the current $I_{Lr}$ flowed out of the resonance inductor Lr has a peak, the both-ends voltage $V_{Cr}$ of the resonance capacitor Cr is equal to the input voltage Vin. And, the current $I_{Lr}$ flowed out of the resonance inductor Lr has the peak value which is equal to the maximum output current value, for example, of ten amperes. In the meanwhile, the current $I_{Lo}$ flowing through the output inductor Lo gradually approaches zero from the negative value.

When the time t becomes a time instant $t_3$, the current $I_{Lr}$ flowing through the resonance inductor Lr becomes zero and the both-ends voltage $V_{Cr}$ of the resonance capacitor Cr becomes a voltage 2Vin which is twice the input voltage Vin. And the current $I_{Lo}$ flowing through the output inductor Lo becomes zero.

In the manner which is described above, a duration between the time instant $t_2$ and the time instant $t_3$ is equal to a positive half cycle of the resonance period in the above-mentioned series resonance circuit.

After the time instant $t_3$, the above-mentioned series resonance circuit is in a negative half cycle of the resonance period. That is, the current $I_{Lr}$ flowing through the resonance inductor Lr becomes the negative value and the resonance capacitor Cr is discharged, as shown in FIG. 2D. In addition, the current $I_{Lo}$ flowing through the output inductor Lo becomes the positive value, as shown in FIG. 2E, to charge the output capacitor Co.

When the time t becomes a time instant $t_4$, the current $I_{Lr}$ flowing through the resonance inductor Lr becomes zero again. That is, a duration between the time instant $t_3$ and the time instant $t_4$, is equal to the negative half cycle of the resonance period in the above-mentioned series resonance circuit. Although illustration is omitted, the full-wave current resonance type DC/DC converter 10 illustrated in FIG. 1 comprises a current detection arrangement for detecting the current $I_{Lr}$ flowing through the resonance inductor Lr. Supplied from the current detection arrangement with a zero-current detected signal indicating that the current $I_{Lr}$ flowing through the resonance inductor Lr is zero, the driver controller 20 changes the driving high-side gate signal VGH from the logic high level to the logic low level. Therefore, the current $I_{Lo}$ flowing through the output inductor Lo gradually becomes small.

When the time t becomes a time instant $t_5$, the both-ends voltage $V_{Cr}$ of the resonance capacitor Cr becomes zero bolt. Although illustration is omitted, the full-wave current resonance type DC/DC converter 10 illustrated in FIG. 1 comprises a voltage detection arrangement for detecting the both-ends voltage $V_{Cr}$ of the resonance capacitor Cr. Supplied from the voltage detection arrangement with a zero-voltage detected signal indicating that the both-ends voltage $V_{Cr}$ of the resonance capacitor Cr is zero volt, the driver controller 20 changes the driving low-side gate signal VGL from the logic low level to the logic high level.

After the time instant $t_5$, the current $I_{Lo}$ flowing through the output voltage Lo continues to decrease. When the time t becomes a time instant $t_6$, the current $I_{Lo}$ flowing through the output inductor Lo becomes zero. After the time instant $t_6$, inasmuch as the discharging current out of the output capacitor Co flows in the output inductor Lo, an absolute value of the negative value of the current $I_{Lo}$ flowing through the output inductor Lo gradually becomes large.

When the time t becomes a time instant $t_7$, the driver controller 20 changes the driving low-side gate signal VGL from the logic high level to the logic low level. After the time instant $t_7$, the full-wave current resonance type DC/DC converter 10 repeats operation after the above-mentioned time instant $t_1$.

In the manner which is described above, it is necessary to always flow the resonance current $I_{Lr}$ having the peak equivalent to the maximum output current value through the resonance inductor Lr also on the no-load or the light load where the output current is small. Therefore, on the no-load or the light load, losses become larger caused by the resonance current $I_{Lr}$ flowing through the resonance inductor Lr and parasitic resonance components of the energizing switch SW1, the resonance inductor Lr, the resonance capacitor Cr, and so on. As a result, the full-wave current resonance type DC/DC converter 10 is disadvantageous in that it has a low degree of efficiency, as mentioned in the preamble of the instant specification.

Figure 3:
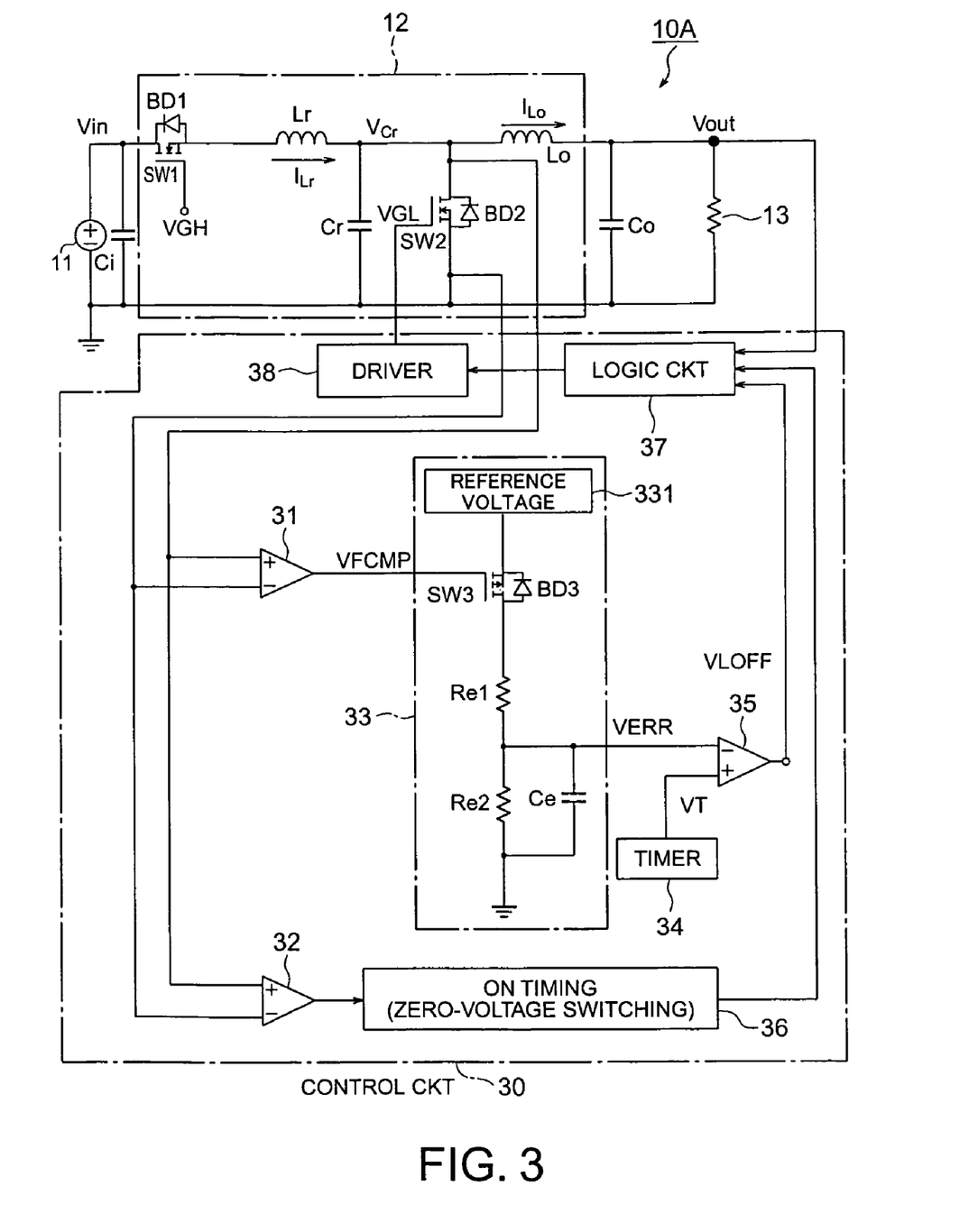
FIG. 3 is a block diagram showing a full-wave current resonance type DC/DC converter according to an embodiment of this invention.

Referring to FIG. 3, the description will proceed to a current resonance type DC/DC converter 10A according to an embodiment of this invention. The illustrated current resonance type DC/DC converter 10A is similar in structure to the current resonance type DC/DC converter 10 illustrated in FIG. 1 except that structure of the control circuit is different from that of the current resonance type DC/DC converter 10 illustrated in FIG. 1. Therefore, the control circuit is depicted at a reference symbol of 30. In addition, those having functions similar to those illustrated in FIG. 1 are depicted at the same reference symbols.

The illustrated current resonance type DC/DC converter 10A is a full-wave current resonance type DC/DC converter of a step-down type and a synchronous type. Accordingly, an output voltage Vout is lower than an input voltage Vin. The full-wave current resonance type DC/DC converter 10A comprises the current resonance type DC/DC converting portion 12 and the control circuit 30. An input capacitor Ci is connected in parallel with an input power supply 11. An output capacitor Co is connected in parallel with a load 13. Between the input capacitor Ci and the output capacitor Co, the current resonance type DC/DC converting portion 12 is connected.

The current resonance type DC/DC converting portion 12 comprises an energizing switch SW1, a resonance inductor Lr, a resonance capacitor Cr, a short-circuit switch SW2, and an output inductor Lo. A combination of the resonance inductor Lr and the resonance capacitor Cr constitutes a series resonance circuit. The series resonance circuit is inserted between the energizing switch SW1 and the short-circuit switch SW2.

The energizing switch SW1 is also called a first switch while the short-circuit switch SW2 is also called a second switch. Each of the energizing switch SW1 and the short-circuit switch SW2 comprises an N-channel metal oxide semiconductor field effect transistor (MOSFET). A first body diode BD1 is parasitic on the first switch SW1 while a second body diode BD2 is parasitic on the second switch SW2. The first and the second body diodes BD1 and BD2 are called first and second parasitic diodes, respectively.

More specifically, the energizing switch SW1 has a source electrode which is equivalently connected to an anode electrode of the first body diode BD1. The energizing switch SW1 has a drain electrode which is equivalently connected to a cathode electrode of the first body diode BD1. The short-circuit switch SW2 has a source electrode which is equivalently connected to an anode electrode of the second body diode BD2. The short-circuit switch SW2 has a drain electrode which is equivalently connected to a cathode electrode of the second body diode BD2.

The energizing switch (the first switch) SW1 has an end (the drain electrode) connected to a positive electrode of the input power supply 11. The energizing switch (the first switch) SW1 has another end (the source electrode) connected to an end of the resonance inductor Lr. The resonance inductor Lr has another end which is grounded through the resonance capacitor Cr. The short-circuit switch (the second switch) SW2 is connected in parallel with the resonance capacitor Cr. Specifically, the short-circuit switch SW2 has an end (the drain electrode) connected to a connection node between the resonance inductor Lr and the resonance capacitor Cr. The short-circuit switch SW2 has another end (the source electrode) which is grounded. The other end of the resonance inductor Lr is also connected to an end of the output inductor Lo. The output inductor Lo has another end which is grounded through the output capacitor Co. The output capacitor Co has both ends between which the output voltage Vout occurs.

The first switch (the energizing switch) SW1 is also called a high-side switch while the second switch (the short-circuit switch) SW2 is also called a low-side switch. Control of turning on/off of the energizing switch SW1 and the short-circuit switch SW2 is carried out by first and second driving control signals supplied from the control circuit 30 which will later be described. More specifically, the control circuit 30 supplies, as the first driving control signal, a driving high-side gate signal VGH to a gate electrode of the energizing switch SW1 while the control circuit 30 supplies, as the second driving control signal, a driving low-side gate signal VGL to a gate electrode of the short-circuit switch SW2.

Although the control circuit 30 comprises a first control portion for generating the driving high-side gate signal VGH and a second control portion for generating the driving low-side gate signal VGL, the first control portion is omitted from the control circuit 30 because the present invention relates to the second control portion.

In the manner which is described above, turning on/off of the short-circuit switch SW2 is controlled by the driving low-side gate signal VGL supplied from the control circuit 30. The control circuit 30 is supplied with the output voltage Vout. In addition, the control circuit 30 is connected to the end (the drain electrode) of the short-circuit switch SW2 and to the other end (the source electrode) of the short-circuit switch SW2. In other words, the control circuit 30 is supplied with the both-ends voltage (a drain voltage) of the resonance capacitor Cr and a grounding voltage (a source voltage).

The control circuit 30 is a circuit for controlling, by detecting a direction of the current $I_{Lo}$ flowing through the output inductor Lo, charging of the resonance capacitor Cr and the resonance current $I_{Lr}$. In other words, the control circuit 30 is a circuit for controlling magnitude of the resonance current $I_{Lr}$ in accordance with the load 30 by changing an off timing of the short-circuit switch SW2. In the example being illustrated, the control circuit 30 controls the magnitude of the resonance current $I_{Lr}$ on the no-load and the light load so as to become smaller than the magnitude of the resonance current $I_{Lr}$ on the heavy load.

Specifically, the control circuit 30 comprises a first comparator 31, a second comparator 32, a voltage level error signal generating circuit 33, a timer 34, a third comparator 35, an on timing (zero-voltage switching) generating circuit 36, a logic circuit 37, and a driver 38.

The first comparator 31 is connected to the drain electrode and the source electrode of the short-circuit switch SW2. The first comparator 31 compares the grounding potential (the source voltage) with the both-ends voltage (the drain voltage) $V_{Cr}$ of the resonance capacitor Cr to produce a first comparison result signal VFCMP. The first comparator 31 has an inverting input terminal supplied with the grounding potential (the source voltage) and a noninverting input terminal supplied with the both-ends voltage (the drain voltage) $V_{Cr}$ of the resonance capacitor Cr. When the both-ends voltage (the drain voltage) $V_{Cr}$ of the resonance capacitor Cr is higher than the grounding potential (the source voltage), the first comparator 31 produces the first comparison result signal VFCMP having a logic high level. When the both-ends voltage (the drain voltage) $V_{Cr}$ of the resonance capacitor Cr is lower than the grounding potential (the source voltage), the first comparator 31 produces the first comparison result signal VFCMP having a logic low level Accordingly, the first comparator 31 serves as a negative voltage detection arrangement for comparing the drain voltage of the short-circuit switch SW2 with the source voltage of the short-circuit switch SW2 to produce a pulse VFCMP while the both-ends voltage $V_{Cr}$ of the resonance capacitor Cr is the negative voltage.

Similarly, the second comparator 32 is also connected to the drain electrode and the source electrode of the short-circuit switch SW2. The second comparator 32 compares the grounding potential (the source voltage) with the both-ends voltage (the drain voltage) $V_{Cr}$ of the resonance capacitor Cr to produce a second comparison result signal. The second comparator 32 has an inverting input terminal supplied with the grounding potential (the source voltage) and a noninverting input terminal supplied with the both-ends voltage (the drain voltage) $V_{Cr}$ of the resonance capacitor Cr. When the both-ends voltage (the drain voltage) $V_{Cr}$ of the resonance capacitor Cr becomes equal to the grounding potential (the source voltage), the second comparator 32 produces the second comparison result signal having a logic low level. When the both-ends voltage (the drain voltage) $V_{Cr}$ of the resonance capacitor Cr is higher than the grounding potential (the source voltage), the second comparator 32 produces the second comparison result signal having a logic high level.

That is, the second comparator 32 acts as a zero-voltage detection arrangement for comparing the drain voltage of the short-circuit switch SW2 with the source voltage of the short-circuit switch SW2 to produce a zero-voltage detected signal when the both-ends voltage of the resonance capacitor Cr is zero volt.

The voltage level error signal generating circuit 33 responds to the first comparison result signal VFCMP to produce a voltage level error signal VERR. More specifically, the voltage level error signal generating circuit 33 comprises a reference voltage generating circuit 331 for generating a reference voltage, a third switch SW3, first and second resistors Re1 and Re2, and a capacitor Ce.

The third switch SW3 comprises a P-channel metal oxide semiconductor field effect transistor (MOSFET). The third switch SW3 is parasitic on a third body diode (parasitic diode) BD3. In other words, the third body diode (parasitic diode) BD3 is equivalently connected in parallel with the third switch SW3. That is, the third switch SW3 has a drain electrode which is equivalently connected to an anode electrode of the third body diode BD3. The third switch SW3 has a source electrode which is equivalently connected to a cathode electrode of the third body diode BD3. The source electrode of the third switch SW3 is supplied with the reference voltage from the reference voltage generating circuit 331. The third switch SW3 has a gate electrode which is supplied with the first comparison result signal (the pulse) VFCMP.

The drain electrode of the third switch SW3 is connected to an end of the first resistor Re1. The first resistor Re1 has another end connected to an end of the second resistor Re2. The second resistor Re2 has another end which is grounded. The capacitor Ce is connected in parallel with the second resistor Re2. A connection node between the first resistor Re1 and the second resistor Re2 produces the voltage level error signal VERR.

At any rate, the voltage level error signal generating circuit 33 includes the capacitor Ce charged during occurrence of the pulse VFCMP to generate the voltage level error signal VERR whose voltage level raises.

The timer 34 produces a timer signal VT having a sawtooth waveform where its voltage level gradually raises, in the manner which will later be described.

The third comparator 35 compares the timer signal VT with the voltage level error signal VERR to produce a third comparison result signal VLOFF. The third comparison result signal VLOFF has a leading edge which defines an off timing of the driving low-side gate signal VGL. The third comparator 35 has an inverting input terminal supplied with the voltage level error signal VERR. The third comparator 35 has a noninverting input terminal supplied with the timer signal VT. When the timer signal VT is higher than the voltage level error signal VERR, the third comparator 35 produces the third comparison result signal VLOFF having a logic high level. When the timer signal VT is lower than the voltage level error signal VERR, the third comparator 35 produces the third comparison result signal VLOFF having a logic low level.

Inasmuch as the third comparison result signal is a signal defining the off timing of the driving low-side gate signal VGL, the third comparison result signal is called an off timing signal. In other words, the third comparator 35 is operable as an off timing generating circuit for comparing the timer signal VT with the voltage level error signal VERR to generate the off timing signal VLOFF for making the short-circuit switch SW2 turn off.

The on timing generating circuit 36 is supplied with the second comparison result signal (the zero-voltage detected signal) from the second comparator 32. Responsive to the second comparison result signal (the zero-voltage detected signal), the on timing generating circuit 36 generates an on timing signal defining a timing for making the short-circuit switch SW2 turn on.

The logic circuit 37 is supplied with the off timing signal VLOFF, the on timing signal, and the output voltage Vout. The logic circuit 37 produces an original low-side gate signal on the basis of the off timing signal VLOFF, the on timing signal, and the output voltage Vout. Responsive to the original low-side gate signal, the driver 38 supplies the driving low-side gate signal VGL to the gate electrode of the short-circuit switch SW2.

At any rate, a combination of the logic circuit 37 and the driver 38 serves as a driving control signal generating arrangement for generating the second driving control signal indicative of turning-off of the short-circuit switch SW2 in response to the off timing signal VLOFF and for generating the second driving control signal indicative of turning-on the short-circuit switch SW2 in response to the on timing signal.

Referring now to FIGS. 4A through 4H and FIGS. 5A through 5H, description will be made as regards operation of the current resonance type DC/DC converter 10A illustrated in FIG. 3. FIGS. 4A through 4H are time charts for use in operations in cases where the current resonance type DC/DC converter 10A is put into two transient states (which will later herein called a transient state A and a transient state B). FIGS. 5A through 5H are time charts for use in another operation in another case where the current resonance type DC/DC converter 10A is put into a steady state.

Figures 4A, 4B:
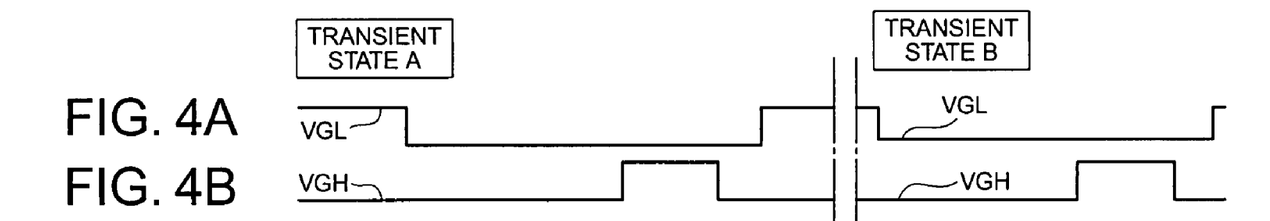
FIGS. 4A through 4H are time charts for use in describing operation in a case where the full-wave resonance type DC/DC converter illustrated in FIG. 3 is put into a transient state.
Figures 4C, 4D:
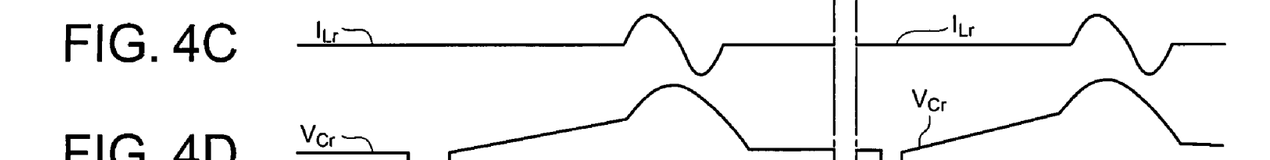
Figures 4E, 4F:
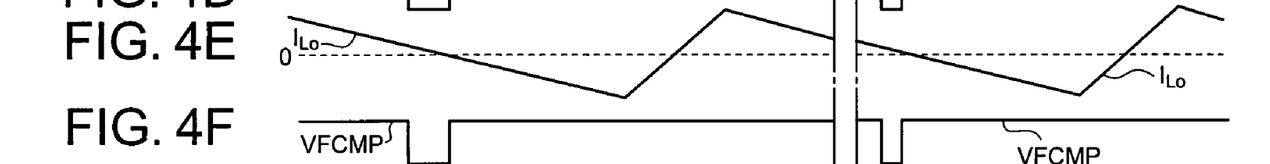
Figure 4G:
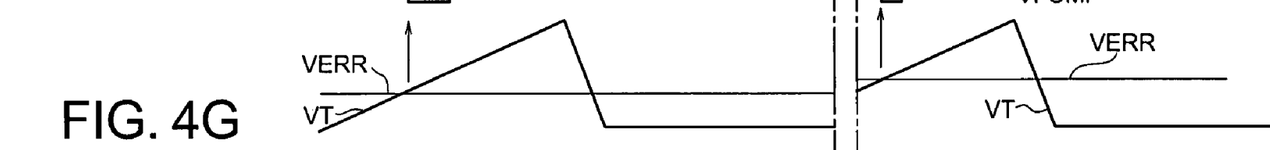
Figure 4H:
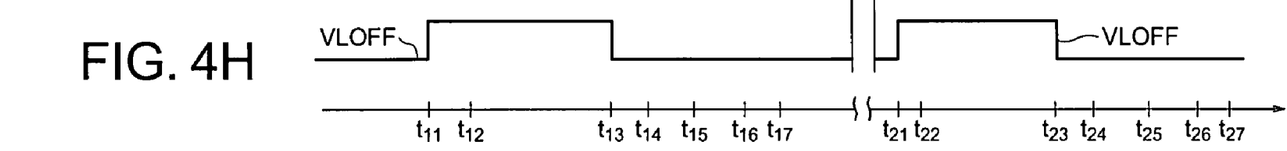
Figure 5A:
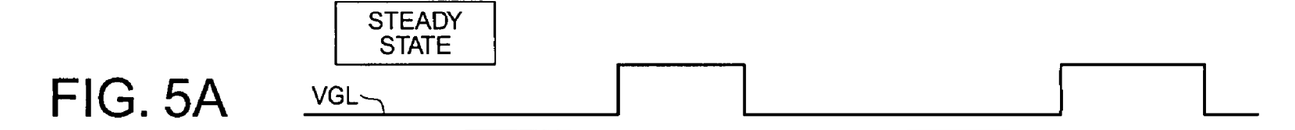
FIGS. 5A through 5H are time charts for use in describing operation in another case where the full-wave resonance type DC/DC converter illustrated in FIG. 3 is put into a steady state.
Figures 5B, 5C, 5D, 5E:
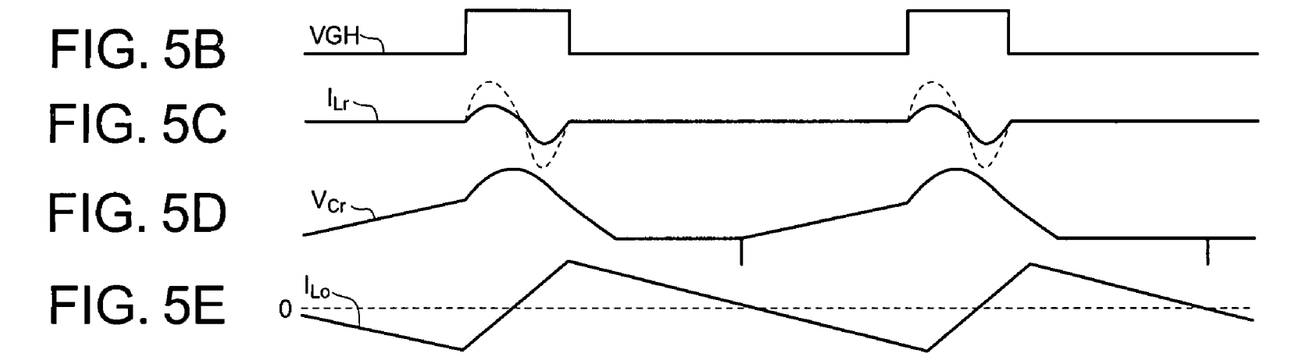
Figure 5F:
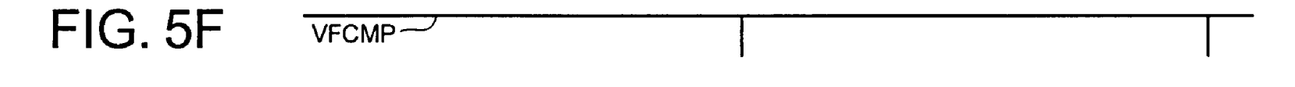
Figure 5G:
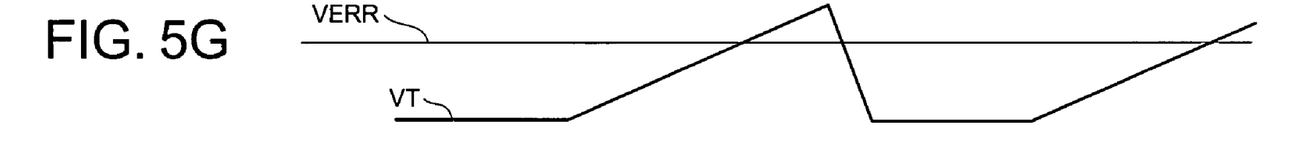
Figure 5H:
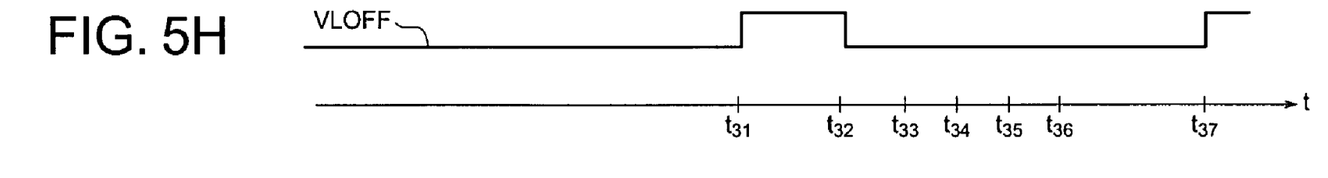

Each of FIGS. 4A and 5A shows a waveform of the driving low-side gate signal VGL. Each of FIGS. 4B and 5B shows a waveform of the driving high-side gate signal VGH. Each of FIGS. 4C and 6C shows a waveform of the resonance current $I_{Lr}$ flowing through the resonance inductor Lr. Each of FIGS. 4D and 5D shows a waveform of the both-ends voltage $V_{Cr}$ of the resonance capacitor Cr. Each of FIGS. 4E and 5E shows a waveform of the current $I_{Lo}$ flowing through the output inductor Lo. Each of FIGS. 4F and 5F shows a waveform of the first comparison result signal VFCMP (the pulse) produced by the first comparator 31. Each of FIGS. 4G and 5G shows a waveform of the voltage level error signal VERR generated from the voltage level error signal generating circuit 33 and a waveform of the timer signal VT produced by the timer 34. Each of FIGS. 4H and 5H shows the third comparison result signal (the off timing signal) VLOFF produced by the third comparator (the off timing generating circuit) 35.

The resonance current $I_{Lr}$ flowing through the resonance inductor Lr has a positive value (a positive direction) when it flows toward the resonance capacitor Cr. The resonance current $I_{Lr}$ flowing through the resonance inductor Lr has a negative value (a negative direction) when it flows toward the energizing switch SW1. Likewise, the current $I_{Lo}$ flowing through the output inductor Lo has a positive value (a positive direction) when it flows toward the output capacitor Co. The current $I_{Lo}$ flowing through the output inductor Lo has a negative value (a negative direction) when it flows toward the short-circuit switch SW2.

Referring first to FIGS. 4A through 4H in addition to FIG. 3, description will be made as regards operation in the cases where the current resonance type DC/DC converter 10A is put into the transient state A and the transient state B.

In the transient state A, inasmuch as the voltage level of the voltage level error signal VERR is yet lower than a regular level, the timer signal VT becomes higher than the voltage level error signal VERR at a time instant $t_{11}$ at which the current $I_{Lo}$ flowing through the output inductor Lo has the positive value (see FIG. 4G). Therefore, the off timing generating circuit 35 changes the off timing signal VLOFF from the logic low level to the logic high level, as shown in FIG. 4H. Responsive to the off timing signal VLOFF through the logic circuit 37, the driver 38 changes the driving low-side gate signal VGL from the logic high level to the logic low level, as shown in FIG. 4A. At this time instant, the driving high-side gate signal VGH is kept to the logic low level.

At the time instant $t_{11}$ at which both of the driving high-side gate signal VGH and the driving low-side gate signal VGL have the logic low level, the current $I_{Lo}$ flowing through the output inductor Lo flows in the positive direction, as shown in FIG. 4E. In this event, the current flows through the second body diode BD2 which is the parasitic diode of the short-circuit switch SW2. Therefore, the both-ends voltage $V_{Cr}$ of the resonance inductor Cr becomes the negative voltage.

While the both-ends voltage (the drain voltage) $V_{Cr}$ of the resonance capacitor Cr becomes lower than the grounding voltage (the source voltage), the first comparator 31 produces the first comparison result signal VFCMP having the logic low level, as shown in FIG. 4F. Inasmuch as the first comparison result signal VFCMP has the logic low level, the third switch SW3 in the voltage level error signal generating circuit 31 is turned on. As a result, the current flows in the capacitor Ce through the first resistor Re1 from the reference voltage generating circuit 331 to charge the capacitor Ce. Thus, the voltage level error signal VERR generated from the voltage level error signal generating circuit 31 raises.

When a time t becomes a time instant $t_{12}$, the current $I_{Lo}$ flowing through the output inductor Lo changes from the positive direction to the negative direction. Therefore, the both-ends voltage $V_{Cr}$ of the resonance capacitor Cr becomes the positive voltage which is higher than the grounding voltage. As a result, the first comparator 31 changes the first comparison result signal VFCMP from the logic low level to the logic high level (see FIG. 4F). When the comparison result signal VFCMP takes the logic high level, the third switch SW3 is turned off. Therefore, inasmuch as the current flows out of the capacitor Ce through the second resistor Re2 to discharge Ce, the voltage level of the voltage level error signal VERR comes down.

At any rate, for the during between the time instant $t_{11}$ and time instant $t_{12}$, the capacitor Ce is charged and the voltage level error signal VERR raises.

When the voltage level error signal VERR raises, the leading edge of the off timing signal VLOFF, which is produced by the off timing generating circuit 35 for comparing the timer signal VT with the voltage level error signal VERR, is late or delayed. That is, the driving low-side gate signal VGL has a late off timing. In an opposite case, the driving low-side gate signal VGL has an early off timing.

When the time t becomes a time instant $t_{13}$, inasmuch as the timer signal VT becomes lower than the voltage level error signal VERR (see FIG. 4G), the off timing generating circuit 35 changes the off timing signal VLOFF from the logic high level to the logic low level.

When the time t becomes a time instant $t_{14}$, the driving high-side gate signal VGH changes from the logic low level to the logic high level. As a result, the series resonance circuit consisting of the resonance inductor Lr and the resonance capacitor Cr stats resonance and the resonance current $I_{Lr}$ having a sinusoidal waveform flows through the resonance inductor Lr, as shown in FIG. 4C. Therefore, the both-ends voltage $V_{Cr}$ of the resonance capacitor Cr becomes high and the current $I_{Lo}$ flowing through the output inductor Lo gradually approaches zero from the negative value.

When the time t becomes a time instant $t_{15}$, the resonance current $I_{Lr}$ becomes zero from the positive value and the both-ends voltage $V_{Cr}$ of the resonance capacitor Cr has the peak. On the other hand, the current $I_{Lo}$ flowing through the output inductor Lo changes the negative value to the positive value.

When the time t becomes a time instant $t_{16}$, the resonance current $I_{Lr}$ becomes zero from the negative value. By detecting this by the current detector (not shown), the control circuit 30 changes the driving high-side gate signal VGH from the logic high level to the logic low level. Responsive to the driving high-side gate signal VGH having the logic low level, the energizing switch SW1 is turned off.

When the time t becomes a time instant $t_{17}$, the both-ends voltage $V_{Cr}$ of the resonance capacitor Cr becomes zero, as shown in FIG. 4D. The second comparator 32 detects that the both-ends voltage $V_{Cr}$ of the resonance capacitor Cr becomes zero to produce the second comparison result signal (the zero-voltage detected signal) having the logic low level. Responsive to the second comparison result signal (the zero-voltage detected signal) having the logic low level, the on timing generating circuit 36 produces the on timing signal. Supplied with the on timing signal through the logic circuit 37, the driver 38 changes the driving low-side gate signal VGL from the logic low level to the logic high level (see FIG. 4A). Responsive to the driving low-side gate signal VGL of the logic high level, the short-circuit switch SW2 is turned on.

In the manner which is described above, in the transient state A, generated from the error signal generating circuit 33, the voltage level of the voltage level error signal VERR rises. As a result, the current resonance DC/DC converter 10A shifts from the transient state A to the transient state B.

In the transient state B, the voltage level error signal VERR has the voltage level which is higher than that in the transient state A.

When the time t becomes a time instant $t_{21}$, the off timing generating circuit 35, which compares the timer signal VT with the voltage level error signal VERR, changes the off timing signal VLOFF from the logic low level to the logic high level (see FIG. 4H). It is understood that the timing of the leading edge of the off timing signal VLOFF is later than that in the transient state A.

Inasmuch as the first comparison result signal VFCMP has the logic low level, the third switch SW3 in the voltage level error signal generating circuit 31 is turned on. As a result, the current flows in the capacitor Ce through the first resistor Re1 from the reference voltage generating circuit 331 to charge the capacitor Ce. Thus, generated from the voltage level error signal generating circuit 31, the voltage level error signal VERR rises.

When the time t becomes a time instant $t_{22}$, the current $I_{Lo}$ flowing through the output inductor Lo turns from the positive direction to the negative direction. Therefore, the both-ends voltage $V_{Cr}$ of the resonance capacitor Cr becomes the positive voltage which is higher than the grounding potential. As a result, the first comparator 31 changes the first comparison result signal VFCMP from the logic low level to the logic high level (see FIG. 4F). When the first comparison result signal VFCMP becomes the logic high level, the third switch SW3 is turned off. Therefore, inasmuch as the current flows out of the capacitor Ce through the second resistor Re2 to discharge the capacitor Ce, the voltage level of the voltage level error signal VERR becomes low.

At any rate, for the during between the time instant $t_{21}$ and the time instant $t_{22}$, the capacitor Ce is charged and the voltage level error signal VERR rises. Inasmuch as the duration between the time instant $t_{21}$ and the time instant $t_{22}$ is shorter than the duration between the time instant $t_{11}$ and the time instant $t_{12}$ in the transient state A, a risen level of the voltage level error signal VERR is less compared with that in a case of the transient state A.

In the manner which is described above, when the voltage level error signal VERR rises, the off timing signal VLOFF, which is produced by the off timing generating circuit 35 for comparing the timer signal VT with the voltage level error signal VERR, has the leading edge which becomes late. That is, the driving low-side gate signal VGL has a late off timing. In an opposite case, the driving low-side gate signal VGL has an early off timing.

When the time t becomes a time instant $t_{23}$, the timer signal VT is lower than the voltage level error signal VERR (see FIG. 4G). Therefore, the off timing generating circuit 35 changes the off timing signal VLOFF from the logic high level to the logic low level.

When the time t becomes a time instant $t_{24}$, the driving high-side gate signal VGH changes from the logic low level to the logic high level. As a result, the series resonance circuit consisting of the resonance inductor Lr and the resonance capacitor Cr starts resonance and the resonance current $I_{Lr}$ having the sinusoidal waveform flows through the resonance inductor Lr. Thus, the both-ends voltage $V_{Cr}$ of the resonance capacitor Cr becomes high and the current $I_{Lo}$ flowing through the output inductor Lo gradually approaches zero from the negative value.

When the time t becomes a time instant $t_{25}$, the resonance current $I_{Lr}$ becomes zero from the positive value and the both-ends voltage $V_{Cr}$ of the resonance capacitor Cr has the peak. On the other hand, the current $I_{Lo}$ flowing through the output inductor Lo changes from the negative value to the positive value, as shown in FIG. 4E.

When the time t becomes a time instant $t_{26}$, the resonance current $I_{Lr}$ becomes zero from the negative value. By detecting this by the current detector (not shown), the control circuit 30 changes the driving high-side gate signal VGH from the logic high level to the logic low level. Responsive to the driving high-side gate signal VGH having the logic low level, the energizing switch SW1 is turned off.

When the time t becomes a time instant $t_{27}$, the both-ends voltage VCr of the resonance capacitor Cr becomes zero, as shown in FIG. 4D. The second comparator 32 detects that both-ends voltage $V_{Cr}$ of the resonance capacitor Cr becomes zero to produce the second comparison result signal (the zero-voltage detected signal) having the logic low level. Responsive to the second comparison result signal (the zero-voltage detected signal) having the logic low level, the on timing generating circuit 36 generates the on timing signal. Responsive to the on timing signal through the logic circuit 37, the driver 38 changes the driving low-side gate signal VGL from the logic low level to the logic high level (see FIG. 4A): Responsive to the driving low-side gate signal VGL having the logic high level, the short-circuit switch SW2 is turned on.

In the manner which is described above, in the transient state B, generated from the error signal generating circuit 33, the voltage level error signal VERR has the voltage level which rises slightly. By such a feedback loop, the current resonance type DC/DC converter 10A is put into the steady state in a short time.

Referring now to FIGS. 5A to 5H, description will be made as regards operation in the other case where the current resonance type DC/DC converter 10A is put into the steady state.

In the steady state, the voltage level of the voltage level error signal VERR is substantially equal to the regular level. Therefore, at a time instant $t_{31}$ at which the current $I_{Lo}$ flowing through the output inductor Lo is substantially equal to zero, the timer signal VT is higher than the voltage level error signal VERR (see FIG. 5G). Therefore, the off timing generating circuit 35 changes the off timing signal from the logic low level to the logic high level, as shown in FIG. 5H. Supplied with the off timing signal through the logic circuit 37, the driver 38 changes the driving low-side gate signal VGL from the logic high level to the logic low level, as shown in FIG. 5A. At this time instant, the driving high-side gate signal VGH is kept to the logic low level.

At the time instant $t_{31}$ at which both of the driving high-side gate signal VGH and the driving low-side gate signal VGL have the logic low level, the current $I_{Lo}$ flowing through the output inductor Lo has the positive value which is almost near zero, as shown in FIG. 5E. In this event, the current flows through the second body diode BD2 which is the parasitic diode of the short-circuit switch SW2. Therefore, the both-ends voltage $V_{Cr}$ of the resonance capacitor Cr instantaneously becomes the negative voltage, as shown in FIG. 5D.

While the both-ends voltage $V_{Cr}$ of the resonance capacitor Cr becomes lower than the grounding potential, the first comparator 31 produces the first comparison result signal VFCMP having the logic low level, as shown in FIG. 5F. Inasmuch as the first comparison result signal VFCMP has the logic low level, the third switch SW3 in the error signal generating circuit 33 is instantaneously turned on. As a result, the current instantaneously flows in the capacitor Ce through the first resistor Re1 from the reference voltage generating circuit 331 to charge the capacitor Ce. Therefore, generated from the error signal generating circuit 33, the voltage level error signal VERR only slightly rises.

When the time t becomes a time instant after the elapse of only moment from the time instant $t_{31}$, the current $I_{Lo}$ flowing through the output inductor Lo turns from the positive direction to the negative direction. Accordingly, the both-ends voltage $V_{Cr}$ of the resonance capacitor Cr becomes the positive voltage which is higher than the grounding potential. As a result, the first comparator 31 changes the first comparison result signal VFCMP from the logic low level to the logic high level (see FIG. 5F). When the first comparison result signal VFCMP becomes the logic high level, the third switch SW3 is turned on. Therefore, inasmuch as the current flows out of the capacitor Ce through the second resistor Re2 to discharge the capacitor Ce, the voltage level of the voltage level error signal VERR becomes lower.

That is to say, in a case where electric charges for charging the capacitor Ce through the first resistor Re1 and electric charges discharged out of the capacitor Ce through the second resistor Re2 are equal to each other, the voltage level error signal VERR is almost kept to a constant value.

Inasmuch as the voltage level error signal VERR is substantially constant, produced by the off timing generating circuit 35 for comparing the timer signal VT with the voltage error signal VERR, the off timing signal has the leading edge which does not change thereafter. That is, the off timing of the driving off-side gate signal VGL becomes a substantially same timing.

When the time t becomes a time instant $t_{32}$, the timer signal VT is lower than the voltage level error signal VERR (see FIG. 5G). Therefore, the off timing generating circuit 35 changes the off timing signal VLOFF from the logic high level to the logic low level.

When the time t becomes a time instant $t_{33}$, the driving high-side gate signal VGH changes the logic low level to the logic high level. As a result, the series resonance circuit consisting of the resonance inductor Lr and the resonance capacitor Cr starts resonance and the resonance current $I_{Lr}$ having the sinusoidal waveform flows through the resonance inductor Lr, as shown in FIG. 5C. Thus, the both-ends voltage $V_{Cr}$ of the resonance capacitor Cr rises and the current $I_{Lo}$ flowing through the output inductor Lo gradually approaches zero from the positive value.

When the time t becomes a time instant $t_{34}$, the resonance current $I_{Lr}$ becomes zero from the positive value and the both-ends of the resonance capacitor Cr has the peak. On the other hand, the current $I_{Lo}$ flowing through the output inductor Lo changes from the negative value to the positive value, as shown in FIG. 5E.

When the time t becomes a time instant $t_{35}$, the resonance current $I_{Lr}$ becomes zero from the negative value. By detecting this by the current detector (not shown), the control circuit 30 changes the driving high-side gate signal VGH from the logic high level to the logic low level. Responsive to the driving high-side gate signal VGH having the logic low level, the energizing switch SW1 is turned off.

When the time t becomes a time instant $t_{36}$, the both-ends voltage $V_{Cr}$ of the resonance capacitor Cr becomes zero, as shown in FIG. 5D. The second comparator 35 detects that the both-ends voltage $V_{Cr}$ of the resonance capacitor Cr becomes zero to produce the second comparison result signal (the zero-voltage detected signal) having the logic low level. Responsive to the second comparison result signal (the zero-voltage detected signal) having the logic low level, the on timing generating circuit 36 generates the on timing signal. Supplied with the on timing signal through the logic circuit 37, the driver 38 changes the driving low-side gate signal VGL from the logic low level to the logic high level (see FIG. 5A). Responsive to the driving low-side gate signal VGL having the logic high level, the short-circuit switch SW2 is turned on.

When the time t becomes a time instant $t_{37}$ at which the current $I_{Lo}$ flowing through the output inductor Lo is substantially equal to zero, the timer signal VT becomes higher than the voltage level error signal VERR (see FIG. 5G). Accordingly, the off timing generating circuit 35 changes the off timing signal VLOFF from the logic low level to the logic high level. Thereafter, operation similar to those from the above-mentioned time instant $t_{31}$ is repeated, as shown in FIG. 5H.

In the manner which is described above, it is understood in the steady state that the off timing of the driving low-side signal VGL converges in the vicinity of a timing at which the current $I_{Lo}$ flowing through the output inductor Lo is zero.

As apparent from the above-mentioned operation, it is possible to decrease the resonance current $I_{Lr}$, as shown in FIG. 5C, by controlling the charging to the resonance capacitor Cr and the resonance current $I_{Lr}$ using the current $I_{Lo}$ flowing through the output inductor Lo.

At any rate, the control circuit 30 produces the second driving control signal VGL so at to turn the short-circuit switch SW2 off the moment at which the current $I_{Lo}$ flowing through the output inductor Lo flows toward the short-circuit switch SW2.

In the manner which is clear in the above-mentioned description, it is possible for the current resonance type DC/DC converter 10A according to the embodiment of this invention to decrease the resonance current $I_{Lr}$ on the no-load and the light load. As a result, it is possible to drastically decrease the losses caused by the respective parasitic resistance of the energizing switch SW1, the resonance inductor Lr, the resonance capacitor Cr, and so on.

In addition, the current resonance type DC/DC converter 10A according to the embodiment of this invention is operable at a current discontinuous mode in the full-wave current resonance type DC/DC converter at it is on the no-load and the light load. Therefore, the operating frequency of the current resonance type DC/DC converter 10A becomes lower and it is possible to furthermore decrease the losses.

Furthermore, inasmuch as the current resonance type DC/DC converter 10A according to the embodiment of this invention only make the resonance current $I_{Lr}$ decrease on the no-load and the light load, a condition of the zero-current switching which is advantage intrinsically is maintained. Therefore, the switching loss is decreased as before.

Although the MOSFETs are used as the switches in the example being illustrated in FIG. 3, bipolar transistors, junction FETs, or the like are used as the switches.

While this invention has thus far been described in conjunction with a preferred embodiment thereof, it will now readily possible for those skilled in the art to put this invention into various manners. For example, although the full-wave current resonance type DC/DC converter of the step-down type and the synchronous type is exemplified in the above-mentioned embodiment, this invention may be applicable to a step-up type, a polarity reversing type, or other types and the full-wave current resonance type DC/DC converter may be an asynchronous type. In a case of the asynchronous type, a diode is used in place of the short-circuit switch SW2.

What is claimed is:

1. A method of controlling a resonance current flowing through a resonance circuit in a current resonance type DC/DC converter comprising a current resonance type DC/DC converting portion including a switch and said resonance circuit, said method comprising:
   detecting a load on the current resonance type DC/DC converter; and
   controlling a magnitude of the resonance current in accordance with the detected load by changing an off timing of said switch so as to make the magnitude of the resonance current on no-load or a light load smaller than on a heavy load.

2. A method of controlling a resonance current flowing through a resonance inductor in a current resonance type DC/DC converter including a current resonance type DC/DC converting portion which comprises an energizing switch, said resonance inductor, a resonance capacitor, a short-circuit switch, and an output inductor, wherein said energizing switch is turned on/off in response to a first driving control signal, said resonance inductor has a first end connected to said energizing switch, said resonance capacitor has a first end connected to a second end of said resonance inductor and a second end which is grounded, said short-circuit switch is connected in parallel with said resonance capacitor and is turned on/off in response to a second driving control signal, and said output inductor has a first end connected to the second end of said resonance inductor and a second end connected to an end of an output capacitor, said method comprising:
   detecting a current flowing through the output inductor; and
   producing the second driving control signal so as to make said short-circuit switch turn off when a current flowing through said output inductor flows toward said short-circuit switch, thereby controlling a magnitude of the resonance current in accordance with a load so as to make the magnitude of said resonance current on no-load or a light load smaller than on a heavy load.

3. The method as claimed in claim 2, wherein said short-circuit switch comprises an N-channel metal oxide semiconductor field effect transistor (MOSFET), and a parasitic diode that is parasitic on said short-circuit switch, and wherein said method comprises:
   producing a pulse when a both-ends voltage of said resonance capacitor has a negative voltage;
   producing a voltage level error signal whose voltage level rises with a capacitor charged during production of said pulse;
   producing a timer signal having a sawtooth waveform whose voltage level gradually rises;
   comparing the timer signal with the voltage level error signal to generate an off timing signal defining a timing for making said short-circuit switch turn off; and
   producing, in response to the off timing signal, the second driving control signal for turning said short-circuit switch off.

4. A current resonance type DC/DC converter including a current resonance type DC/DC converting portion which comprises an energizing switch that is turned on/off in response to a first driving control signal, a resonance inductor having a first end connected to said energizing switch, a resonance capacitor having a first end connected to a second end of said resonance inductor and a second end which is grounded, a short-circuit switch that is connected in parallel with said resonance capacitor and that is turned on/off in response to a second driving control signal, and an output inductor having a first end connected to the second end of said resonance inductor and a second end connected to an end of an output capacitor, wherein said current resonance type DC/DC converter further comprises:
   a control circuit for producing the second driving control signal so as to make said short-circuit switch turn off when a current flowing through said output inductor flows toward said short-circuit switch, thereby controlling a magnitude of a resonance current flowing through said resonance inductor in accordance with a load so as to make the magnitude of said resonance current on no-load or a light load smaller than on a heavy load.

5. The current resonance type DC/DC converter as claimed in claim 4, wherein said short-circuit switch comprises an N-channel metal oxide semiconductor field effect transistor (MOSFET) having a drain electrode connected to the first end of said output inductor and a source electrode which is grounded, and a parasitic diode that is parasitic on said short-circuit switch, wherein said control circuit comprises:
   a negative voltage detection arrangement for comparing a drain voltage of said short-circuit switch with a source voltage of said short-circuit switch to produce a pulse when a both-ends voltage of said resonance capacitor has a negative voltage;
   a voltage level error signal generating circuit including a capacitor which is charged during production of said pulse, said voltage level error signal generating circuit generating a voltage level error signal whose voltage level rises;

a timer for producing a timer signal having a sawtooth waveform whose voltage level gradually rises;

an off timing generating circuit for comparing the timer signal with the voltage level error signal to generate an off timing signal defining a timing for making said short-circuit switch turn off; and a driving control signal generating arrangement for generating, in response to the off timing signal, the second driving control signal indicative of turning-off of said short-circuit switch.

6. The current resonance type DC/DC converter as claimed in claim 5, wherein said control circuit further comprises:

a zero-voltage detection arrangement for comparing the drain voltage of said short-circuit switch with the source voltage of said short-circuit switch to produce a zero-voltage detected signal when the both-ends voltage of said resonance capacitor is equal to zero; and an on timing generating circuit for generating, in response to the zero-voltage detected signal, an on timing signal defining a timing for making said short-circuit switch turn on; and wherein said driving control signal generating arrangement generates, in response to the on timing signal, the second driving control signal indicative of turning-on of said short-circuit switch.

* * * * *